US012485922B2

(12) United States Patent
Kuehner et al.

(10) Patent No.: US 12,485,922 B2
(45) Date of Patent: Dec. 2, 2025

(54) SYSTEM AND METHOD FOR MODIFYING THE LONGITUDINAL POSITION OF A VEHICLE WITH RESPECT TO ANOTHER VEHICLE TO INCREASE PRIVACY

(71) Applicant: Toyota Jidosha Kabushiki Kaisha, Toyota (JP)

(72) Inventors: Manuel Ludwig Kuehner, Mountain View, CA (US); Hiroshi Yasuda, San Francisco, CA (US); Andrea Lazcano, Brussels (BE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 18/100,087

(22) Filed: Jan. 23, 2023

(65) Prior Publication Data

US 2024/0246566 A1    Jul. 25, 2024

(51) Int. Cl.
*B60W 60/00* (2020.01)
*B60J 1/08* (2006.01)
*B60W 40/08* (2012.01)

(52) U.S. Cl.
CPC ............ *B60W 60/0013* (2020.02); *B60J 1/08* (2013.01); *B60W 2040/0881* (2013.01)

(58) Field of Classification Search
CPC ..... B60W 60/0013; B60W 2554/4041; B60W 60/001; B60W 2554/40; B60J 1/08
See application file for complete search history.

(56) References Cited

U.S. PATENT DOCUMENTS

| 8,392,064 | B2 |   | 3/2013 | Thrun et al. |
| 8,977,419 | B2 |   | 3/2015 | Lee et al. |
| 10,562,379 | B2 | * | 2/2020 | Ghannam ................. B60J 3/04 |
| 10,635,917 | B1 | * | 4/2020 | Kim ....................... G06N 3/084 |
| 10,988,166 | B2 |   | 4/2021 | Giersiefer et al. |
| 11,220,266 | B2 | * | 1/2022 | Schreiber ............. G05D 1/0088 |
| 11,654,935 | B2 | * | 5/2023 | Ferguson ................... B60J 1/18 |
|            |    |   |        | 701/25 |
| 11,878,575 | B2 | * | 1/2024 | Flanigan ............... G02F 1/0121 |
| 12,017,518 | B1 | * | 6/2024 | Mazuir ............... G02F 1/13306 |
| 2017/0185088 | A1 | * | 6/2017 | Sakai ................ B60W 50/0097 |
| 2017/0327094 | A1 | * | 11/2017 | Inoue ..................... B60W 30/09 |

(Continued)

FOREIGN PATENT DOCUMENTS

DE    102017208475 A1 * 11/2018  ............ B60J 1/2011
DE    102022112168 A1 * 11/2023

*Primary Examiner* — Khoi H Tran
*Assistant Examiner* — Tyler Roger Robarge
(74) *Attorney, Agent, or Firm* — Christopher G. Darrow; Darrow Mustafa PC

(57) ABSTRACT

Systems and methods for increasing the privacy of occupants of a vehicle are disclosed. In one example, a system includes a processor and a memory that has a privacy module with instructions. The instructions cause the processor to determine a first vehicle viewing area of a first vehicle and a second vehicle viewing area of a second vehicle. In response to determining when the first vehicle viewing area at least partially overlaps the second vehicle viewing area, the instructions cause the processor to send a control signal to control a longitudinal position of the first vehicle and/or the second vehicle such that the first vehicle viewing area does not overlap the second vehicle viewing area.

17 Claims, 11 Drawing Sheets

(56) References Cited

U.S. PATENT DOCUMENTS

| | | | |
|---|---|---|---|
| 2019/0143993 A1* | 5/2019 | Aoi | G06V 20/597 340/439 |
| 2020/0139974 A1 | 5/2020 | Schreiber et al. | |
| 2020/0298674 A1 | 9/2020 | Staser et al. | |

* cited by examiner

SYSTEM AND METHOD FOR MODIFYING THE LONGITUDINAL POSITION OF A VEHICLE WITH RESPECT TO ANOTHER VEHICLE TO INCREASE PRIVACY

TECHNICAL FIELD

The subject matter described herein relates, in general, to systems and methods for increasing the privacy of occupants of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have autonomous or semi-autonomous modes, wherein the vehicle can pilot itself based on different levels of autonomy. In some cases, vehicles that provide some level of autonomy may pilot themselves such that they are aligned with another vehicle in a nearby lane. In particular, when operating on a multilane expressway, situations may arise where two vehicles travel in the same direction and are aligned with each other for extended periods. When this occurs, occupants within one vehicle may inadvertently (or purposely) make eye contact with the occupants of the nearby vehicle. This eye contact with unknown occupants of the nearby vehicle may make individuals feel uncomfortable. Furthermore, the close proximity of the vehicles allows the occupants of one vehicle to peer into the cabin of the other vehicle, further degrading the privacy expectations of individuals.

SUMMARY

This section generally summarizes the disclosure and is not a comprehensive explanation of its full scope or all its features.

In one embodiment, a system includes a processor and a memory in communication with the processor. The memory includes a privacy module with instructions that, when executed by the processor, cause the processor to determine a first vehicle viewing area of a first vehicle and a second vehicle viewing area of a second vehicle. The first and second vehicle viewing areas are at least partially external to the first and second vehicles. In response to determining when the first vehicle viewing area at least partially overlaps the second vehicle viewing area, the instructions cause the processor to send a control signal to control a longitudinal position of at least one of the first vehicle and the second vehicle such that the first vehicle viewing area does not overlap the second vehicle viewing area.

In another embodiment, a method includes the steps of determining a first vehicle viewing area of a first vehicle and a second vehicle viewing area of a second vehicle. Like before, the first and second vehicle viewing areas are at least partially external to the first and second vehicles. In response to determining when the first vehicle viewing area at least partially overlaps the second vehicle viewing area, the method includes sending a control signal to control a longitudinal position of at least one of the first vehicle and the second vehicle such that the first vehicle viewing area does not overlap the second vehicle viewing area.

In yet another embodiment, a non-transitory computer-readable medium stores instructions that, when executed by a processor, cause the processor to determine a first vehicle viewing area of a first vehicle and a second vehicle viewing area of a second vehicle. Again, the first and second vehicle viewing areas are at least partially external to the first and second vehicles. In response to determining when the first vehicle viewing area at least partially overlaps the second vehicle viewing area, the instructions cause the processor to send a control signal to control a longitudinal position of at least one of the first vehicle and the second vehicle such that the first vehicle viewing area does not overlap the second vehicle viewing area.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for improving the privacy of the occupants of vehicles. There may be instances where two or more vehicles travel next to each other for extended periods. This may occur especially when one or more of the vehicles is a semi-autonomous or autonomous vehicle. When vehicles are traveling next to each other for extended periods, situations may arise wherein the occupants of one vehicle may be able to make eye contact with the occupants of a nearby vehicle and/or look into the interior of the nearby vehicle. When this occurs, the occupants of either vehicle may feel uncomfortable due to the lack of privacy.

The systems and methods described herein determine viewing areas for nearby vehicles based on a number of different factors, such as the presence of occupants, closeness of the vehicles, seating arrangement of the vehicles, placement of windows, dimensions of the vehicles, gaze/head position of occupants, etc. Examples of how the viewing area for each vehicle will be described in later paragraphs. When it is determined that the viewing areas of vehicles traveling close to each other overlap, the systems and methods described herein send a control signal to adjust the longitudinal position of at least one of the vehicles with respect to the other vehicle, essentially causing a phase shift. Generally, the longitudinal position of at least one of the vehicles with respect to the other vehicle is changed to prevent overlapping viewing areas. By so doing, occupants within the vehicle can be more comfortable as a nearby vehicle will not be positioned such that the occupants of the nearby vehicle can make eye contact or look into the vehicle.

Figure 1:
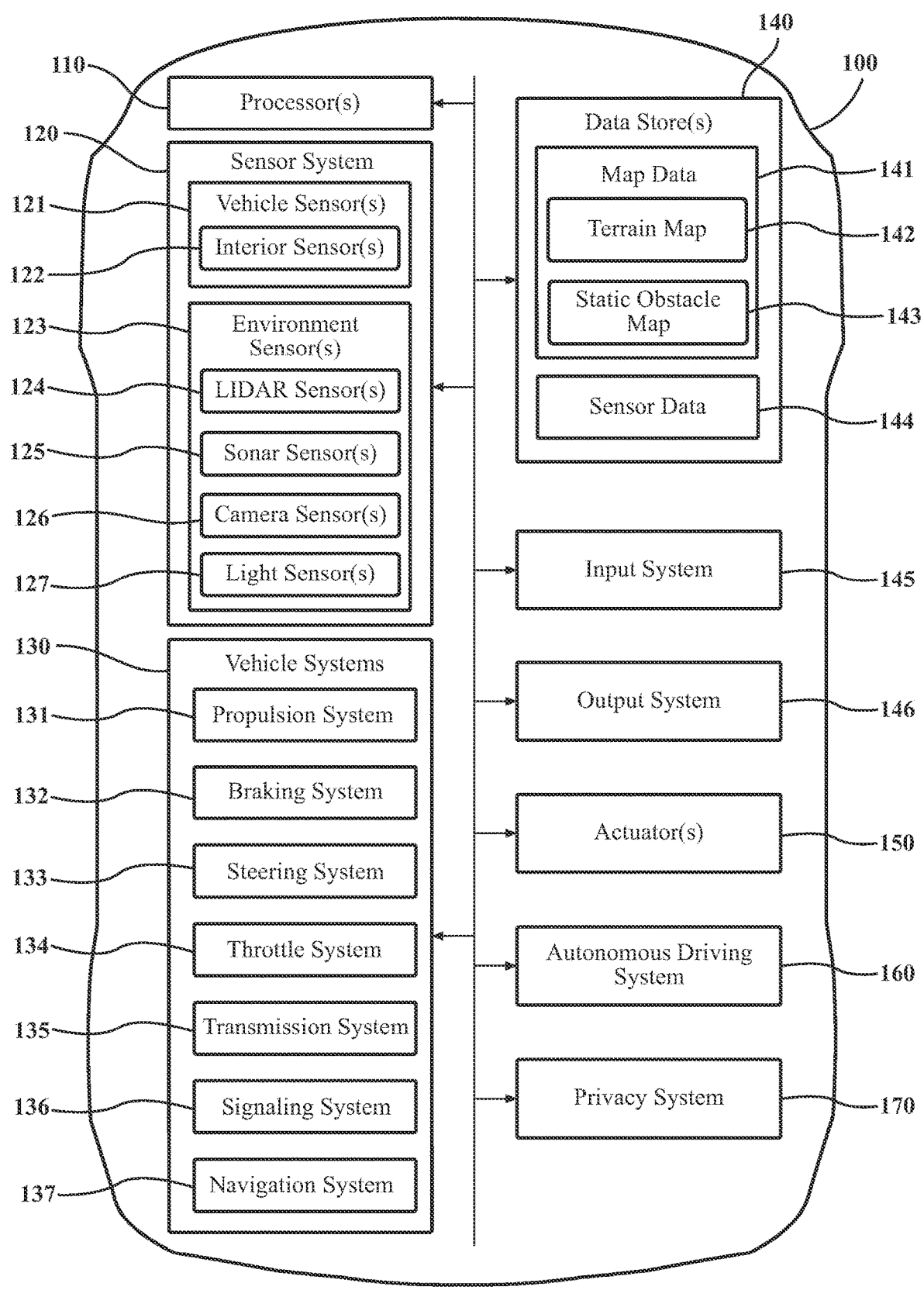
FIG. 1 illustrates a block diagram of a vehicle incorporating a privacy system for increasing occupant privacy by adjusting the longitudinal position of the vehicle with respect to another vehicle.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 160, which will be described later in the specification. As such, the vehicle 100 may be fully autonomous and require little to no human input or may be semi-autonomous and require human input from time to time. Further still, the vehicle 100 could be equipped with one or more advanced driver assistant systems (ADAS) that can provide some level of support to the driver of the vehicle, such as adaptive cruise control (ACC) that automatically adjusts the speed of the vehicle 100 to maintain a safe distance from a preceding vehicle The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-11 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes privacy system 170. The privacy system 170 may be incorporated within the autonomous driving system 160 or may be separate, as shown. As will be described in greater detail later, the privacy system 170 can determine the viewing area for the vehicle 100 and a nearby vehicle. In situations where the viewing areas of the vehicle 100 and the nearby vehicle overlap, the privacy system 170 can adjust the longitudinal position of the vehicle 100 such that the viewing areas of the vehicle 100 and the nearby vehicle no longer overlap. The privacy system 170 may adjust the longitudinal position of the vehicle 100 by interacting with one or more vehicle systems 130, such as the braking system 132, the throttle system 134, and/or the transmission system 135. Of course, depending on the vehicle type, the privacy system 170 may adjust other systems or subsystems to change the longitudinal position of the vehicle 100 with respect to the nearby vehicle.

Figure 2:
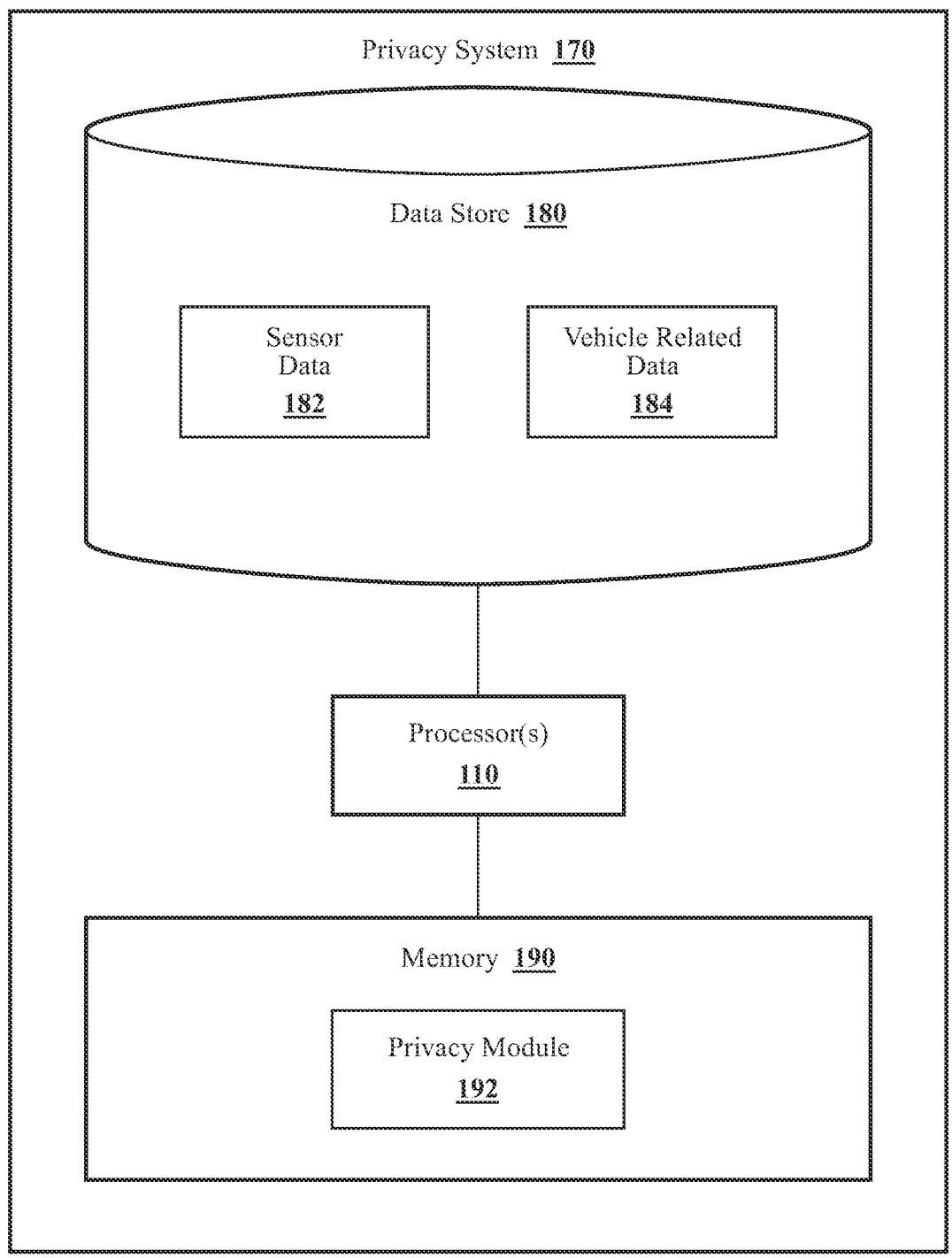
FIG. 2 illustrates a block diagram of the privacy system of FIG. 1.

With reference to FIG. 2, one embodiment of the privacy system 170 is further illustrated. As shown, the privacy system 170 includes one or more processor(s) 110. Accordingly, the processor(s) 110 may be a part of the privacy system 170 or the privacy system 170 may access the processor(s) 110 through a data bus or another communication path. In one or more embodiments, the processor(s) 110 is an application-specific integrated circuit that is configured to implement functions associated with a privacy module 192. In general, the processor(s) 110 is an electronic processor, such as a microprocessor, capable of performing various functions described herein.

In one embodiment, the privacy system 170 includes a memory 190 that stores the privacy module 192. The memory 190 is a random-access memory (RAM), read-only memory (ROM), a hard disk drive, a flash memory, or other suitable memory for storing the privacy module 192. The privacy module 192 is, for example, computer-readable instructions that, when executed by the processor(s) 110, cause the processor(s) 110 to perform the various functions disclosed herein.

Furthermore, in one embodiment, the privacy system 170 includes a data store 180. The data store 180 may be a part of the data store(s) 140 of the vehicle 100 or separate therefrom. The data store 180 is, in one embodiment, an electronic data structure such as a database that is stored in the memory 190 or another memory and that is configured with routines that can be executed by the processor(s) 110 for analyzing stored data, providing stored data, organizing stored data, generating stored data and so on. Thus, in one embodiment, the data store 180 stores data used by the privacy module 192 in executing various functions.

In one embodiment, the data store 180 may store sensor data 182 and vehicle related data 184. The sensor data 182 may be data generated by one or more sensors of the vehicle 100, such as sensors that form part of the sensor system 120. Alternatively or additionally, the sensor data 182 can also include sensor data collected from other vehicles and/or infrastructure that have been transmitted to the vehicle 100 using wireless communication methodologies, such as dedicated short-range communication (DSRC), Wi-Fi, wireless LAN (WLAN), cellular methodologies, C-V2X, and the like. As will be explained later, the sensor data 182 can be utilized to determine viewing areas of the vehicle 100 and/or other nearby vehicles.

The vehicle related data 184 can include data related to the vehicle 100 and/or other nearby vehicles that were not generated by sensors. This type of data can include vehicle dimensions, the number of windows a vehicle has, seating arrangements of the vehicle, and other information regarding the vehicle 100 and/or other nearby vehicles that may have been identified. Again, as will be explained later, the vehicle related data 184 can be utilized to determine viewing areas of the vehicle 100 and/or other nearby vehicles.

Figure 3:
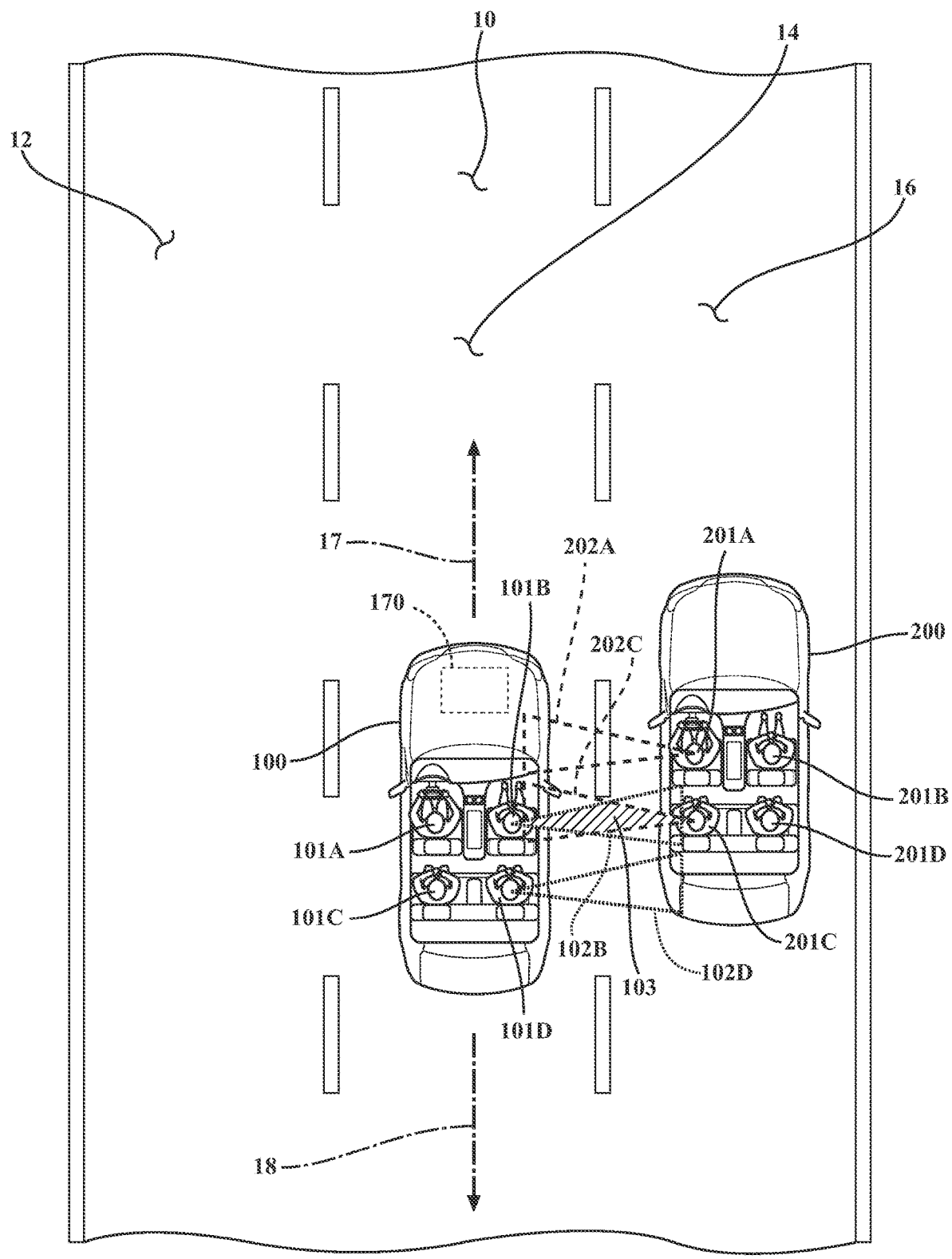
FIGS. 3 and 4 illustrate one example of cone-shaped overlapping vehicle viewing areas of nearby vehicles and the longitudinal movement of one of the vehicles to prevent overlapping vehicle viewing areas, respectively.

To better visualize how the privacy system 170 improved the privacy of the occupants of vehicles, reference is made to FIG. 3. Here, illustrated is a road 10 that includes lanes 12, 14, and 16. The road 10 can be any type of road, such as a traditional open-access road, or can include limited-access highways. In this example, the road 10 includes three lanes, but it should be understood that the configuration of the road 10 can vary from environment to environment.

Traveling upon the lane 14 is the vehicle 100, which includes the privacy system 170. In this example, the vehicle 100 is a sedan that includes occupants 101A-101D. The occupants 101A and 101C are located on the driver side of the vehicle 100, while the occupants 101B and 101D are located on the passenger side of the vehicle 100. Also traveling on the road 10 in the lane 16 is a nearby vehicle 200. In this example, the vehicle 100 and the nearby vehicle 200 are relatively close to each other and are partially aligned in the lateral direction. In this example, the nearby vehicle 200 is also a sedan that includes occupants 201A-201D. The occupants 201A and 201C are located on the driver side of the vehicle 200, while the occupants 201B and 201D are located on the passenger side of the vehicle 200.

As such, the occupants 101B and 101D of the vehicle 100 are situated relatively close to the occupants 201A and 201C of the nearby vehicle. Due to the close proximity and the alignment of the vehicle 100 with respect to the nearby vehicle 200, situations may arise wherein the occupants 101A-101D may make eye contact with the occupants 201A-201D and/or allow occupants from either the vehicles 100 or 200 to peer into the interior of the adjacent vehicle. These situations may make the occupants 101A-101D and/or 201A-201D uncomfortable and feel they do not have appropriate privacy.

To improve privacy, the privacy module 192 includes instructions that, when executed by the processor(s) 110, cause the processor(s) 110 to determine viewing areas of the vehicles 100 and 200. A vehicle may include multiple areas of view. In FIG. 3, for example, the vehicle 100 includes vehicle viewing areas 102B and 102D, while the nearby vehicle 200 includes vehicle viewing areas 202A and 202C. In this example, the vehicle viewing areas 102B and 102D are constructed by the processor(s) 110 to represent generic vehicle viewing areas of the occupants 101B and 101D, respectively. Similarly, the vehicle viewing areas 202A and 202C are constructed by the processor(s) 110 to represent generic vehicle viewing areas of the occupants 201A and 201C. As will be explained later, the vehicle viewing areas 102B, 102D, 202A, and 202C may be generic or may be dynamic and may change based on the location and presence of occupants within the vehicles 100 and/or 200 and/or head/gaze of the occupants within the vehicles 100 and/or 200. In another example, the vehicle viewing areas 102B, 102D, 202A, and 202C may simply be generically extended from a vehicle's lateral side without knowledge of the location and/or presence of any occupants. Again, the vehicle viewing areas 102B, 102D, 202A, and 202C may represent the field of view of the occupants 101B, 101D, 201A, and 201C, respectively, when looking through a window, such as a side window, of the vehicle.

As mentioned before, the vehicles 100 and 200 may have any one of a number of vehicle viewing areas that may be generated by the processor(s) 110 according to the instructions stored within the privacy module 192. Therefore, additional vehicle viewing areas can also be generated for the other occupants, such as the occupants 101A, 101C, 201B, and/or 201D. Additionally, the shape and the positioning of the vehicle viewing areas 102B, 102D, 202A, and/or 202C can take various shapes. In this example, the vehicle viewing areas 102B, 102D, 202A, and/or 202C are generally conical or triangular but can also be other shapes, such as rectangular.

The vehicle viewing areas 102B, 102D, 202A, and/or 202C may be based on the sensor data 182 and/or the vehicle related data 184. As explained previously, the sensor data 182 may be collected from the sensor system 120 of the vehicle 100 or may be collected from other nearby vehicles. The sensor data 182 may include information, such as captured camera images, regarding the position of one or more windows of the vehicle 100 and/or a nearby vehicle 200, ambient external light (bright and sunny or dark and cloudy), the physical dimensions of the vehicle 100 and/or the nearby vehicle 200, the presence and location of occupants within the vehicle 100 and/or the nearby vehicle 200, the open/close status of one or more windows of the vehicle 100 and/or the nearby vehicle 200, and the like.

The vehicle related data 184 may be data that relates to the vehicle 100 and/or the nearby vehicle 200 that was collected without the use of sensor information. For example, the vehicle related data can include the time of day that the vehicle 100 and/or the nearby vehicle 200 are operating, stored physical dimensions of the vehicle 100 and/or the nearby vehicle 200 collected from a database, and other information. The vehicle related data 184 can also include operating information of the vehicle 100, such as if an interior light has been turned on or if privacy shades have been deployed. The vehicle related information can also include characteristics of the vehicle 100, such as if the vehicle has tinted windows capable of providing privacy to the occupants.

As such, information within the sensor data 182 and/or the vehicle related data 184 may be utilized by the processor(s) 110 to change the size, shape, and even presence of the vehicle viewing areas 102B, 102D, 202A, and/or 202C. Factors that generally increase visibility, such as turning on an interior light, bright and sunny weather, daytime travel, lack of window tinting and/or other window treatments, presence of occupants, open windows, and the like may increase the size of the vehicle viewing areas 102B, 102D, 202A, and/or 202C. Conversely, factors that reduce visibility, such as turning off an interior light, cloudy/dark weather, nighttime travel, tinting and/or other privacy window treatments, and the like, would reduce the size of the vehicle viewing areas 102B, 102D, 202A, and/or 202C.

Once the processor(s) 110 has generated the vehicle viewing areas 102B, 102D, 202A, and/or 202C, the privacy module 192 causes the processor(s) 110 to determine if portions of the vehicle viewing areas 102B and 102D of the vehicle 100 overlap any portions of the vehicle viewing areas 202A and 202C of the nearby vehicle 200. In this example, there is an overlap 103 between the vehicle viewing area 102B of the vehicle 100 and the vehicle viewing area 202A of the nearby vehicle 200.

When an overlap occurs, such as the overlap 103, the privacy module 192 causes the processor(s) 110 to send a control signal to change the longitudinal position of the vehicle 100 with respect to the nearby vehicle 200. In one example, the processor(s) 110 may send control signals to the vehicle systems 130, such as the braking system 132, the throttle system 134, and/or the transmission system 135, to change the longitudinal position of the vehicle 100 with respect to the nearby vehicle 200. As such, the vehicle 100 may accelerate in a forward direction, as indicated by the arrow 17, or may decelerate in a rearward direction, as indicated by the arrow 18. It should also be understood that the vehicle 100 and the nearby vehicle 200 may be connected vehicles and may be able to adjust their longitudinal positions with respect to each other by communicating with each other. As such, the privacy module 192 may cause the processor(s) 110 to send control signals to not only the systems of vehicle 100 but also to the systems of nearby vehicle 200 so that both vehicles may cooperatively change their longitudinal position with respect to each other.

Additionally or alternatively, when the overlap 103 is detected, the privacy module 192 may cause the processor(s) 110 to wait for a period of time before adjusting the longitudinal position of the vehicle 100 with respect to the nearby vehicle 200. For example, the longitudinal position of the vehicle 100 with respect to the nearby vehicle 200 may only begin to be adjusted when the overlap 103 exists for greater than five seconds. By so doing, this prevents the vehicle 100 from constantly adjusting its longitudinal position with respect to another vehicle when there is an overlap.

Also, the size of the overlap 103 can be utilized when determining when to adjust the longitudinal position of the vehicle 100 with respect to the nearby vehicle 200. For example, the amount of time that the processor(s) 110 waits before adjusting the longitudinal position of the vehicle 100 with respect to the nearby vehicle 200 may be directly proportional to the size of the overlap 103. As such, larger overlaps may be adjusted more quickly, while smaller overlaps may be adjusted more slowly or even not at all. For example, if it is determined that the overlap 103 is below a threshold area, the processor(s) 110 may forgo adjusting the longitudinal position of the vehicle 100 with respect to the nearby vehicle 200 until the size of the overlap area becomes larger than the threshold area.

Figure 4:
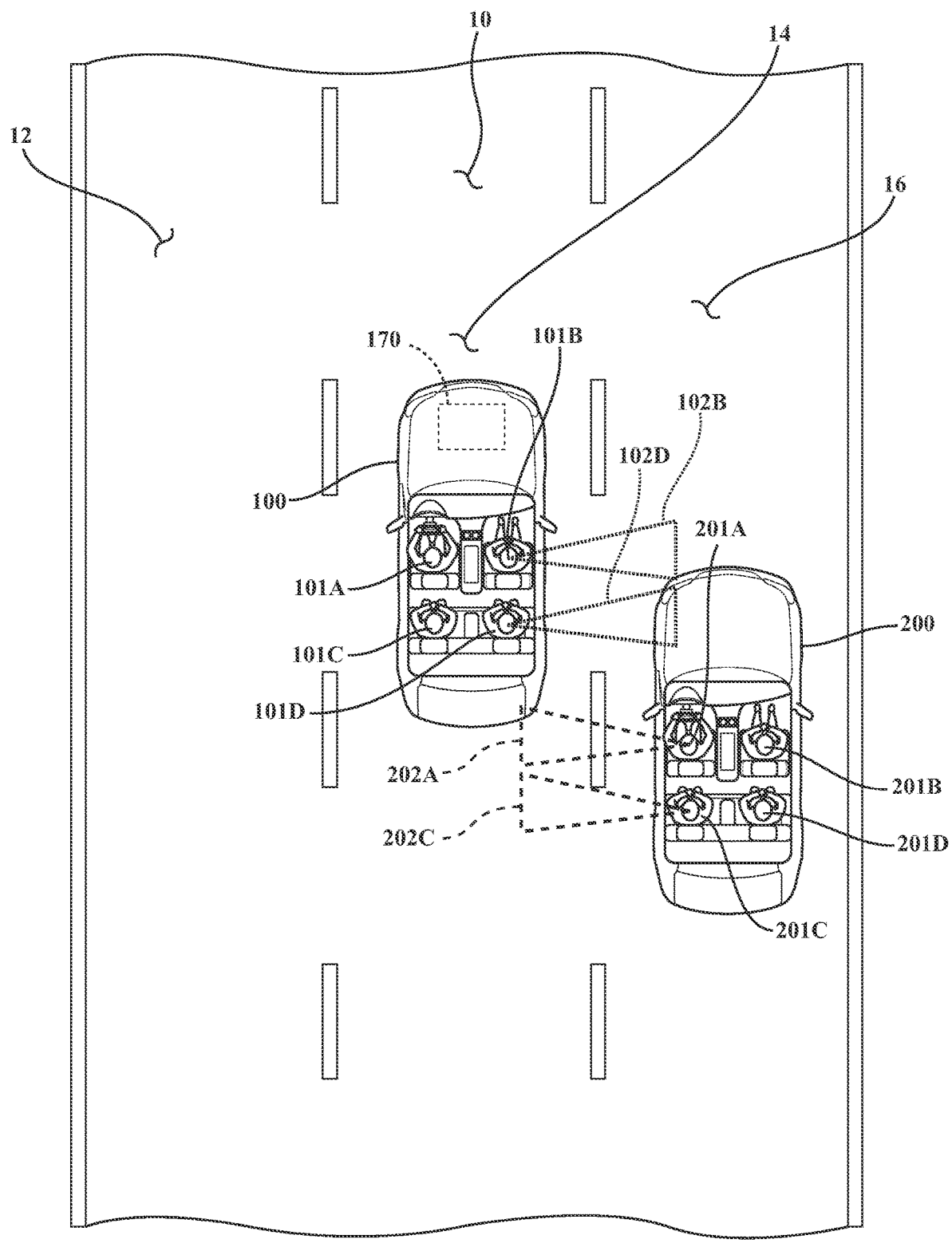

FIG. 4 illustrates a situation wherein the longitudinal position of the vehicle 100 with respect to the vehicle 200 has been adjusted such that the vehicle viewing areas 102B and 102D of the vehicle 100 do not overlap the vehicle viewing areas 202A and 202C of the nearby vehicle 200. In this example, the longitudinal position of the vehicle 100 with respect to the nearby vehicle 200 was adjusted such that the vehicle 100 has been moved forward. Of course, instead of moving the vehicle 100 forward, of the nearby vehicle 200 the vehicle 100 could be moved in a rearward direction with respect to the nearby vehicle 200.

Figure 5:
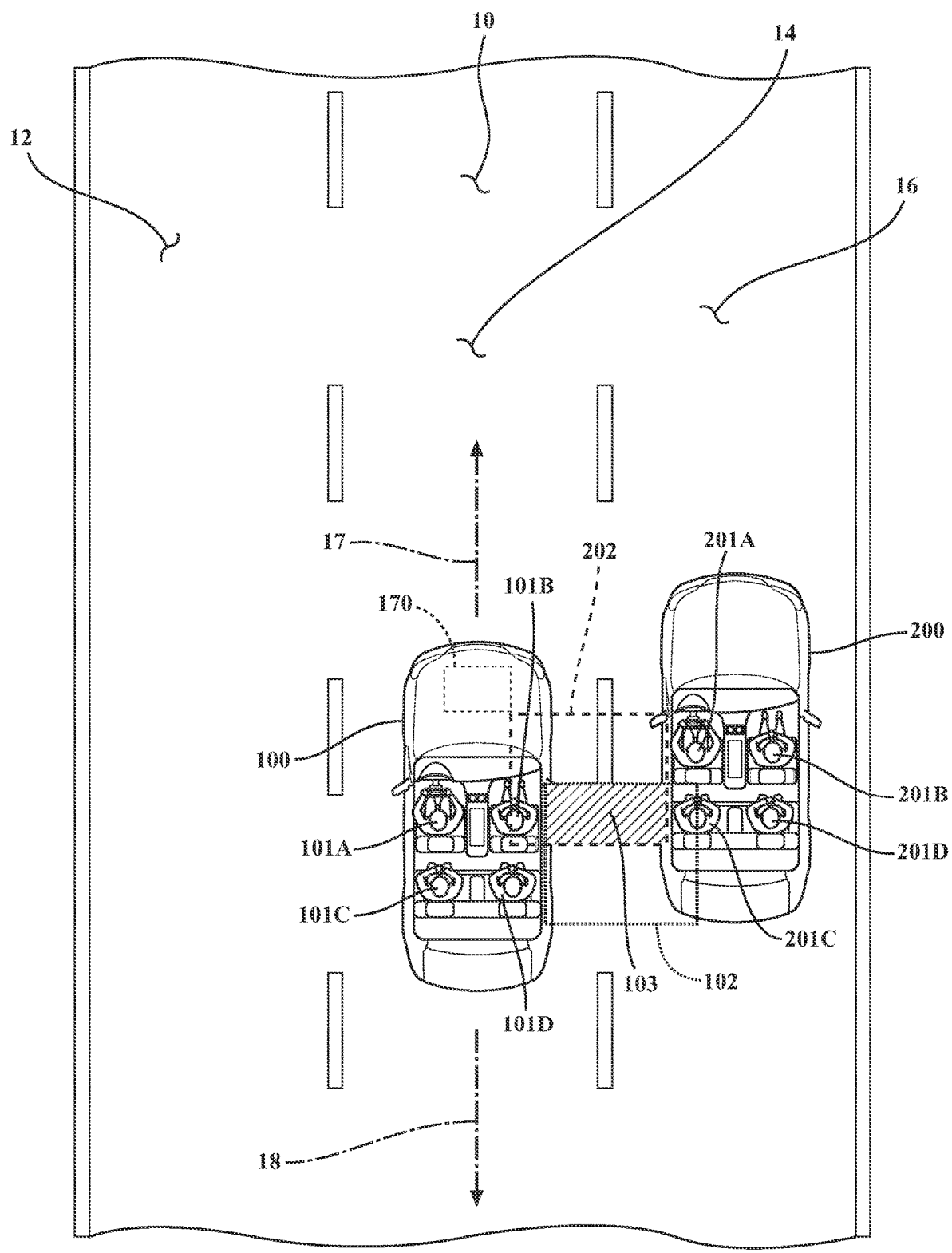
FIGS. 5 and 6 illustrate one example of rectangular-shaped overlapping vehicle viewing areas of nearby vehicles and the longitudinal movement of one of the vehicles to prevent overlapping vehicle viewing areas, respectively.
Figure 6:
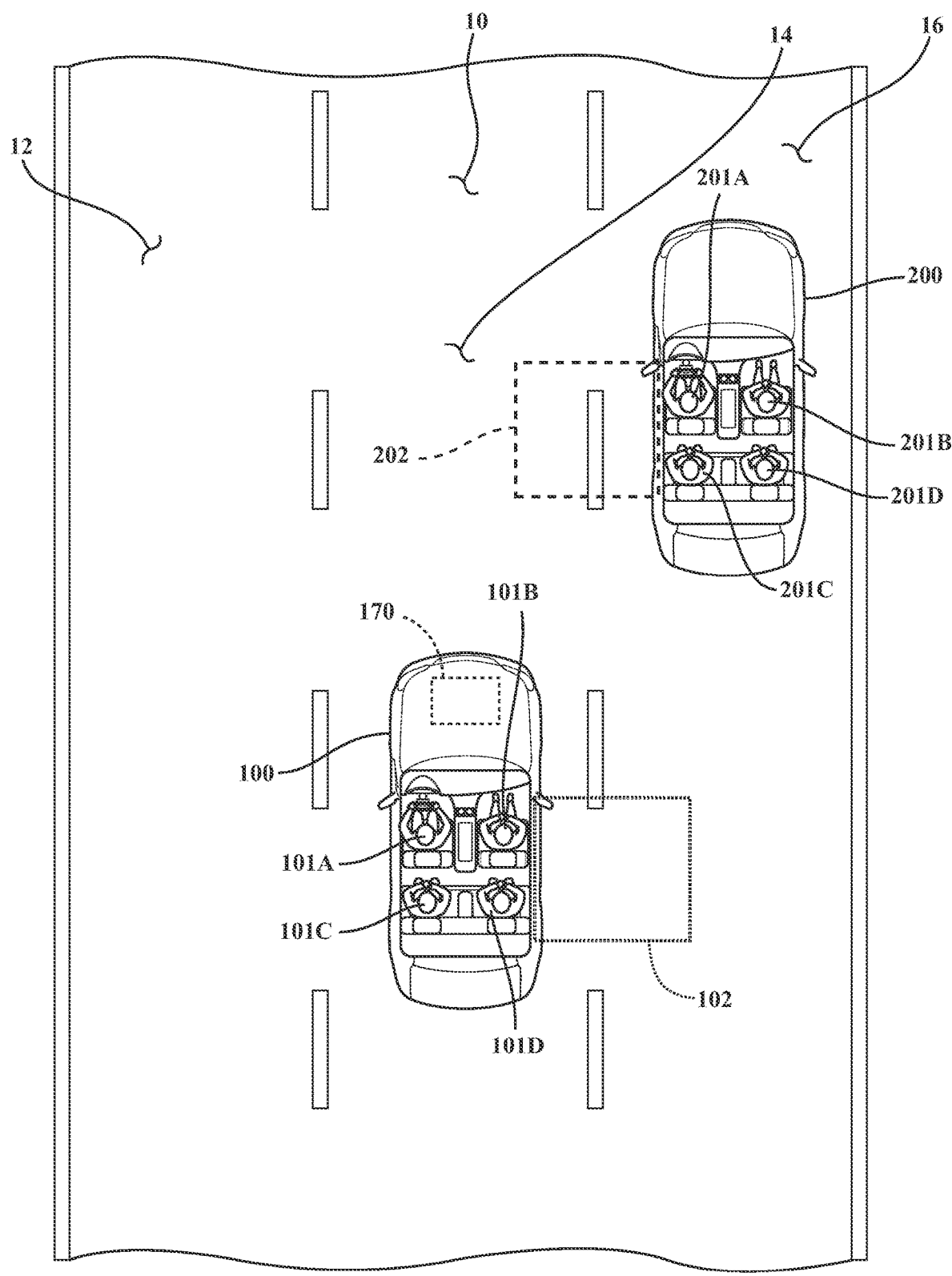

FIG. 5 illustrates another example of the vehicle 100 and the nearby vehicle 200 traveling close to each other, similar to FIG. 3. In this example, the viewing areas 102 and 202 of the vehicles 100 and 200, respectively, are shown as rectangles that extend laterally from each of the vehicles 100 and 200. As such, instead of having multiple viewing areas extending from each vehicle, this example merely has a single viewing area extending from one side of the vehicle. Like before, an overlap 103 is shown where the viewing area 102 overlaps the viewing area 202. As explained before, when the overlap 103 is detected, the processor(s) 110 adjusts the longitudinal position of the vehicle 100 with respect to the nearby vehicle 200. As shown in FIG. 6, in this example, the processor(s) 110 caused the vehicle 100 to move rearward of the nearby vehicle 200 to eliminate the overlap 103 and increase the privacy of the occupants of both vehicles.

Figure 7:
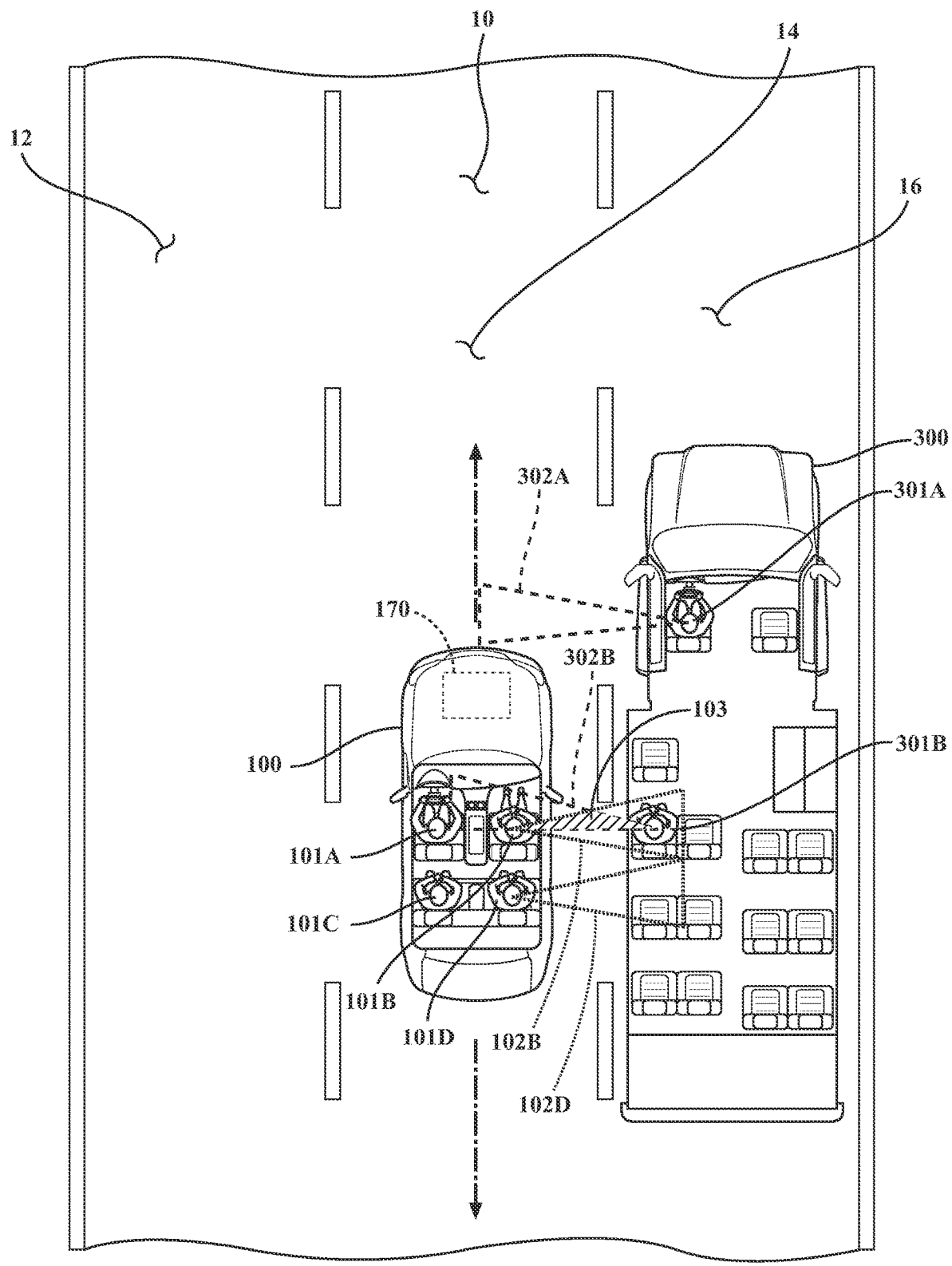
FIGS. 7 and 8 illustrate one example of determining overlapping vehicle viewing areas between vehicles having different seating/occupant positions and the longitudinal movement of one of the vehicles to prevent overlapping vehicle viewing areas, respectively.
Figure 8:
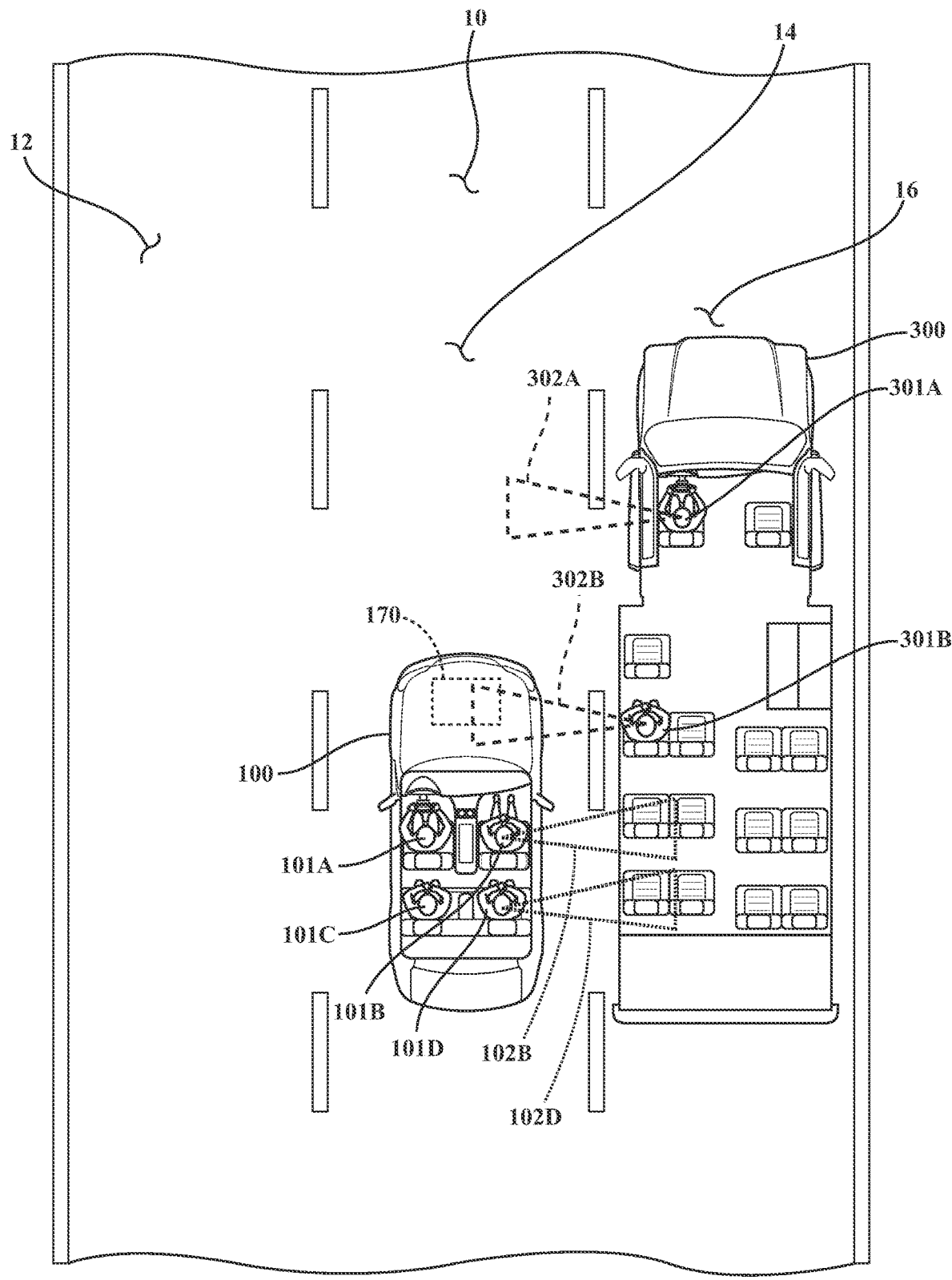

As mentioned before, a number of different factors can impact the determination of viewing areas. FIG. 7 illustrates an example wherein the location and presence of occupants are considered when determining viewing areas. In this example, the vehicle 100 is traveling adjacent to a nearby vehicle 300 in the form of a bus. While the nearby vehicle 300 includes numerous seats, only two seats are occupied by occupants 301A and 301B. Here, the privacy module 192 causes the processor(s) 110 to determine the viewing area based on the presence of the occupants 301A and 301B within the nearby vehicle 300. Occupants may be detected using the sensor system 120 of the vehicle 100 or could be provided to the privacy system 170 from information transmitted from the nearby vehicle 300.

As such, in this example, the processor(s) 110 has determined that the nearby vehicle 300 includes the vehicle viewing areas 302A and 302B based on the presence of the occupants 301A and 301B within the nearby vehicle 300, respectively. In this example, the overlap area 103 has also been determined, showing an overlap 103 between the vehicle viewing areas 102B and 302B. Like before, upon detecting the overlap 103, the privacy module 192 causes the processor(s) 110 to adjust the longitudinal position of the vehicle 100 with respect to the nearby vehicle 300 so as to eliminate the overlap 103.

Because not all the seats of the nearby vehicle 300 are occupied, the longitudinal position of the vehicle 100 with respect to the nearby vehicle 300 does not necessarily have to be such that the vehicle 100 is still not partially aligned with the nearby vehicle 300. To better visualize, reference is made to FIG. 8, which illustrates that the longitudinal position of the vehicle 100 with respect to the nearby vehicle 300 has been adjusted to eliminate the overlap 103 but still place the vehicle 100 in alignment with the nearby vehicle 300. Again, this can be accomplished by generating viewing areas based on the presence of occupants within the nearby vehicle 300.

Figure 9:
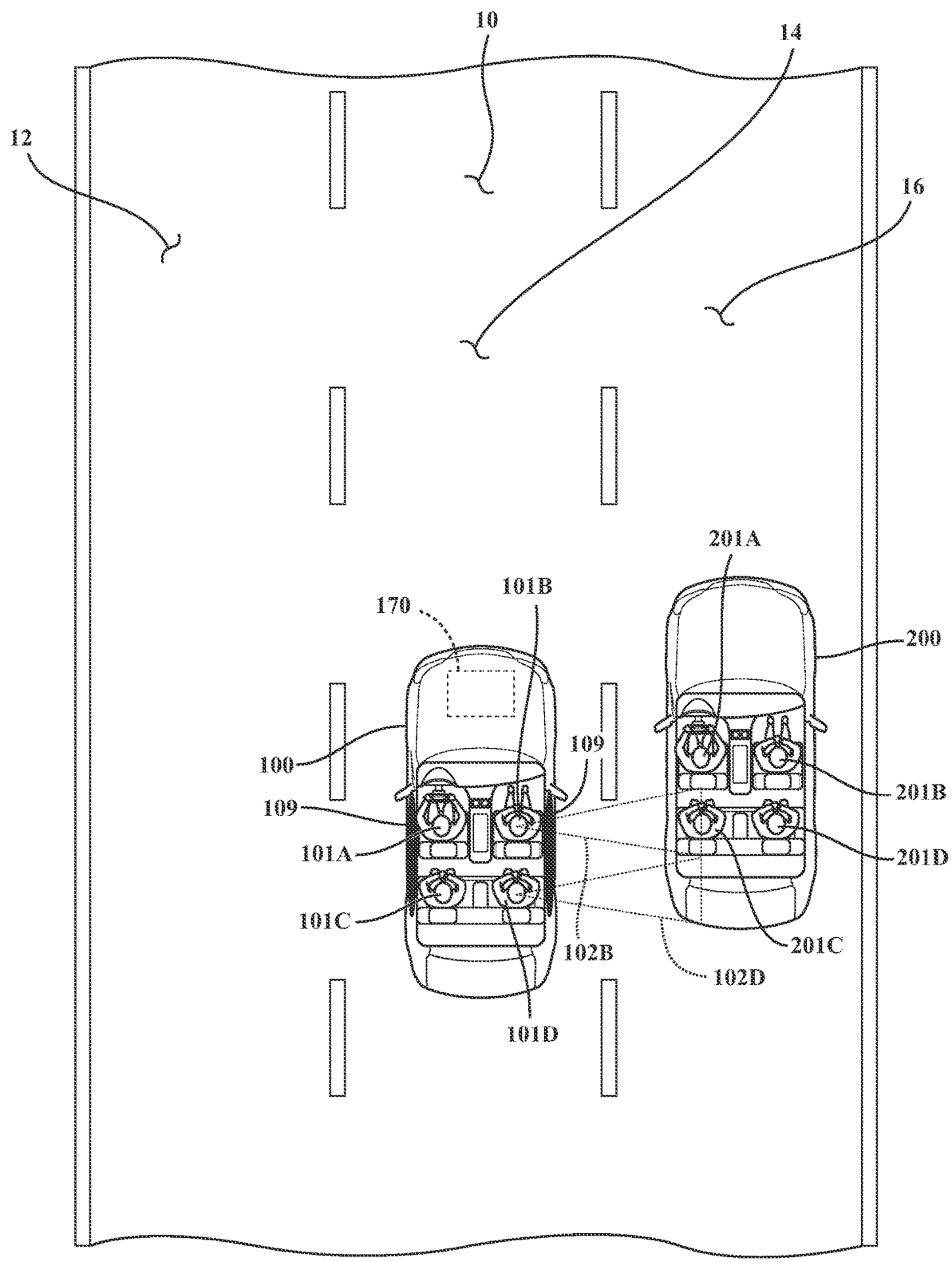
FIG. 9 illustrates an example wherein the vehicle viewing areas of one vehicle are adjusted based on a nearby vehicle having tinted windows.

FIG. 9 illustrates another example of determining viewing areas. In this example, the vehicle 100 is equipped with tinted windows 109 that allow the occupants 101A-101D to see through the windows of the vehicle 100 from the interior of the vehicle 100, but prevents persons external to the vehicle 100 from seeing within the vehicle 100. In this example, because the occupants 201A-201D of the nearby vehicle 200 cannot see through the tinted windows of the vehicle 100, the privacy module 192 may cause the processor(s) 110 to greatly reduce the size of any viewing area of the occupants 201A-201D of the nearby vehicle 200 and/or eliminated altogether. In this example, the processor(s) 110 has eliminated the viewing areas of the occupants 201A-

201D altogether, preventing the creation of any overlap and, therefore, any need to adjust the longitudinal position of the vehicle 100 with respect to the nearby vehicle 200.

Figure 10:
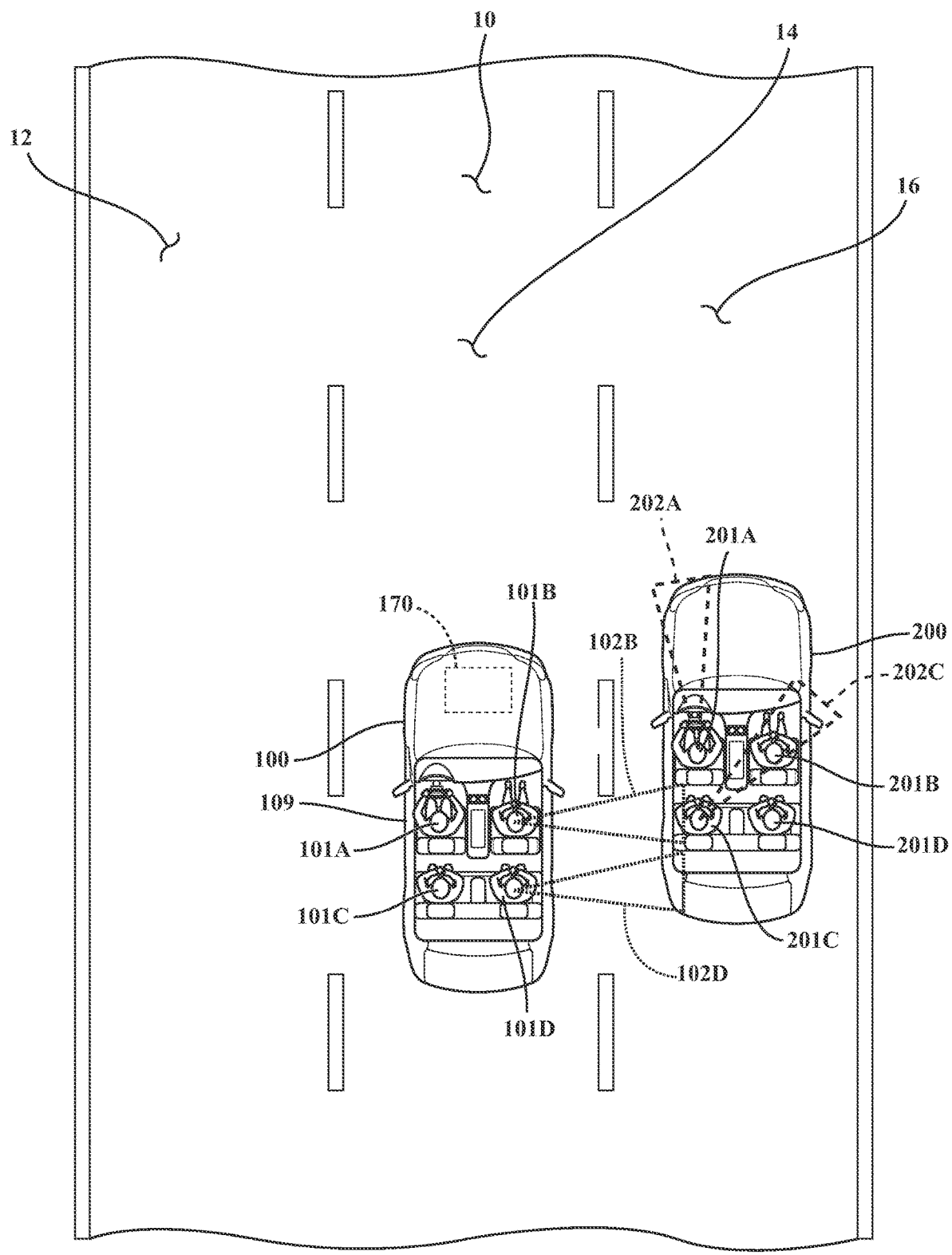
FIG. 10 illustrates an example wherein the vehicle viewing areas of one vehicle are adjusted based on the head position of one or more occupants.

FIG. 10 illustrates yet another example of determining viewing areas, this time by considering the head position and/or gaze of the occupants. Here, the head position and/or gaze of the occupants 201A and 201C of the nearby vehicle 200 are such that they face away from the vehicle 100. As such, the privacy module 192 may cause the processor(s) 110 to determine the vehicle viewing areas 202A and 202C based on the head position and/or gaze of the occupants 201A and 201C, respectively. In one example, this can be accomplished by utilizing sensor data collected by the sensor system 120 of the vehicle 100 and/or sensor data collected from the nearby vehicle 300.

Again, it should be understood that the examples given regarding determining the viewing areas of occupants of the vehicle 100 and any nearby vehicles are merely examples and can vary from application to application. As stated before, other factors can also play a role in determining viewing areas, such as time of day, vehicle interior lighting, open/close status of windows, dimensions of the vehicle, etc.

Figure 11:
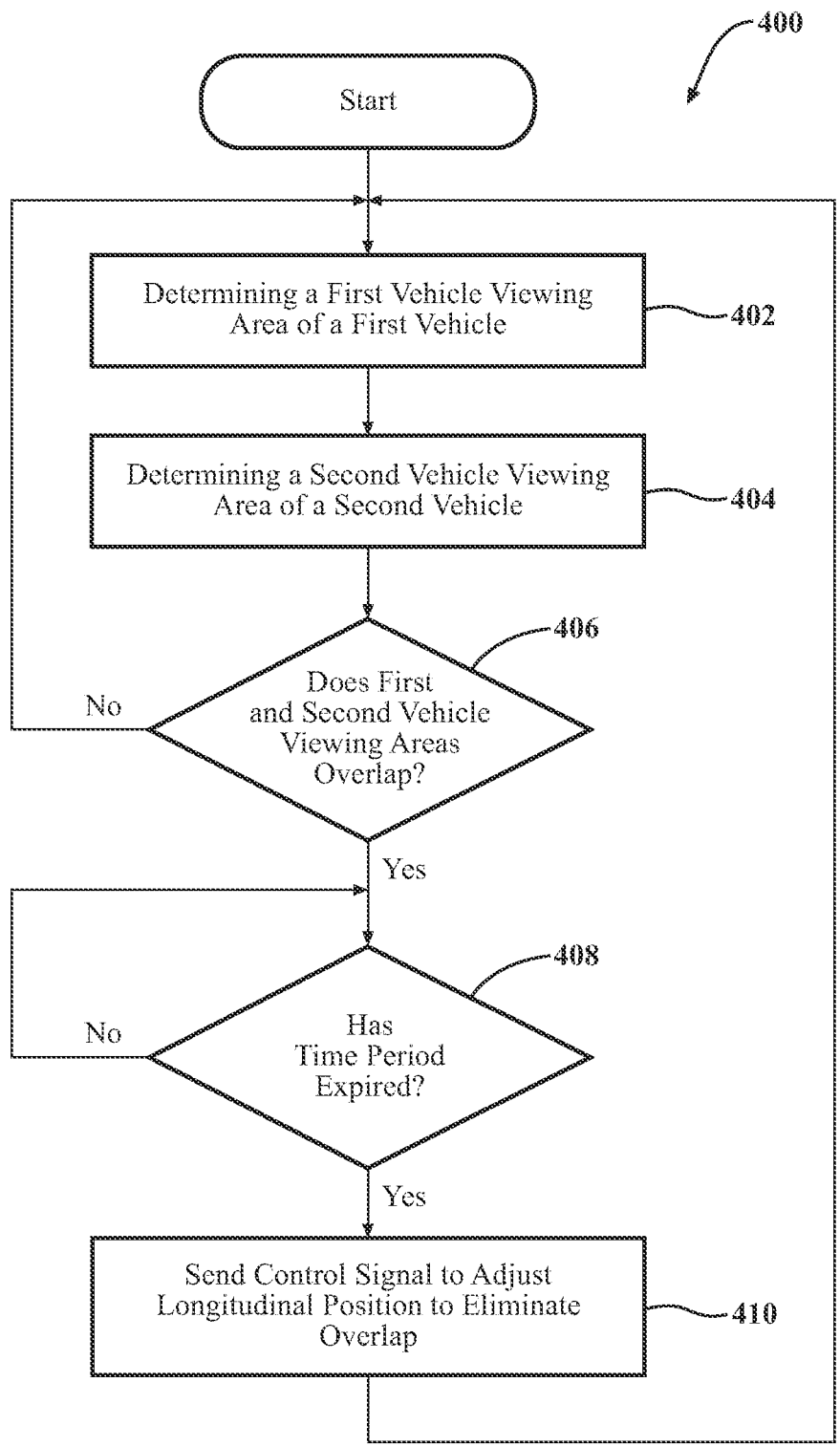
FIG. 11 illustrates an example of a method for increasing occupant privacy by adjusting the longitudinal position of the vehicle with respect to another vehicle.

Referring to FIG. 11, a method 400 for increasing the privacy of vehicle occupants is shown. The method 400 will be described from the viewpoint of the vehicle 100 of FIG. 1, the privacy system 170 of FIG. 2, and the example of the operation of the privacy system 170 illustrated in FIGS. 3 and 4. However, it should be understood that this is just one example of implementing the method 400. While method 400 is discussed in combination with the privacy system 170, it should be appreciated that the method 400 is not limited to being implemented within the privacy system 170, but is instead one example of a system that may implement the method 400.

In step 402, the privacy module 192 includes instructions that, when executed by the processor(s) 110, cause the processor(s) 110 to determine the viewing areas of the vehicle 100. In FIG. 3, for example, the vehicle 100 includes vehicle viewing areas 102B and 102D. The vehicle viewing areas 102B and 102D may be collected utilizing information from the sensor system 120 of the vehicle 100. For example, interior sensor(s) 122, which may include cameras that capture images of the interior of the vehicle 100 and/or occupant detection sensors, such as seat sensors, can be utilized to determine the vehicle viewing areas 102B and 102D.

Alternatively or additionally, instead of utilizing sensor information, the vehicle viewing areas 102B and 102D may simply be generically created on the assumption that occupants sitting within the vehicle may have a certain field of view of the outside. As explained previously, numerous factors can be utilized in determining the viewing areas, such as the position of one or more windows of the vehicle 100, the physical dimensions of the vehicle 100, the presence and location of one or more occupants of the vehicle 100, window treatments of the one or more windows of the vehicle 100, activation of an interior light of the vehicle 100, ambient outdoor light, time of day, and open/close status of the one or more windows of the vehicle 100.

In step 404, the privacy module 192 includes instructions that, when executed by the processor(s) 110, cause the processor(s) 110 to determine the viewing areas of the nearby vehicle 200. In FIG. 3, for example, the nearby vehicle 200 includes vehicle viewing areas 202A and 202C. Again, numerous factors can be utilized to determine vehicle viewing areas 202A and 202C, such as the position of one or more windows of the nearby vehicle 200, the physical dimensions of the nearby vehicle 200, the presence and location of one or more occupants of the nearby vehicle 200, window treatments of the one or more windows of the nearby vehicle 200, activation of an interior light of the nearby vehicle 200, ambient outdoor light, time of day, and open/close status of the one or more windows of the nearby vehicle 200.

In step 406, the privacy module 192 includes instructions that, when executed by the processor(s) 110, cause the processor(s) 110 to determine if portions of the vehicle viewing areas 102B and 102D of the vehicle 100 overlap any portions of the vehicle viewing areas 202A and 202C of the nearby vehicle 200. If no overlap is detected, the method returns to step 402. However, in the example shown in FIG. 3, there is an overlap 103 between the vehicle viewing area 102B of the vehicle 100 and the vehicle viewing area 202A of the nearby vehicle 200.

When there is an overlap, the method proceeds to step 408, wherein the privacy module 192 includes instructions that, when executed by the processor(s) 110, cause the processor(s) 110 to determine how long the overlap is present. Moreover, the privacy module 192 may cause the processor(s) 110 to wait for a period of time before proceeding to the next step, which involves adjusting the longitudinal position of the vehicle 100 with respect to the nearby vehicle 200. For example, the longitudinal position of the vehicle 100 with respect to the nearby vehicle 200 may only begin to be adjusted when the overlap 103 exists for greater than five seconds. By so doing, this prevents the vehicle 100 from constantly adjusting its longitudinal position with respect to another vehicle when there is an overlap.

Once the time period has expired, the method 400 proceeds to step 410, wherein the privacy module 192 includes instructions that, when executed by the processor(s) 110, cause the processor(s) 110 to the privacy module 192 causes the processor(s) 110 to send a control signal to change the longitudinal position of the vehicle 100 with respect to the nearby vehicle 200. In one example, the processor(s) 110 may send control signals to the vehicle systems 130, such as the braking system 132, the throttle system 134, and/or the transmission system 135, to change the longitudinal position of the vehicle 100 with respect to the nearby vehicle 200. It should also be understood that the vehicle 100 and the nearby vehicle 200 may be connected vehicles and may be able to adjust their longitudinal positions with respect to each other by communicating with each other. As such, the privacy module 192 may cause the processor(s) 110 to send control signals to not only the systems of vehicle 100 but also to the systems of the nearby vehicle 200 so that both vehicles may cooperatively change their longitudinal position with respect to each other.

After the longitudinal position of the vehicle 100 has been adjusted with respect to the nearby vehicle 200 to eliminate the overlap 103, the method 400 can either end or return to the beginning. By adjusting the longitudinal position of the vehicle 100 with respect to the nearby vehicle 200 when there is an overlap between viewing areas, the overall privacy of the occupants of either vehicle can be increased by preventing inadvertent eye contact between occupants of different vehicles and/or allowing the occupants of one vehicle to peer inside the interior of another vehicle.

FIG. 1 will now be discussed in full detail as an example environment within which the system and methods disclosed herein may operate. In one or more embodiments, the vehicle 100 is an autonomous vehicle, but it can also be a semi-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As mentioned before, the vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 140 for storing one or more types of data. The data store(s) 140 can include volatile and/or non-volatile memory. Examples of data store(s) 140 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 140 can be a component of the processor(s) 110, or the data store(s) 140 can be operatively connected to the processor(s) 110 for use thereby. The term "operatively connected" and/or "in communication with" as used throughout this description, can include direct or indirect connections, including connections without direct physical contact.

In one or more arrangements, the one or more data store(s) 140 can include map data 141. The map data 141 can include maps of one or more geographic areas. In some instances, the map data 141 can include information or data on roads, traffic control devices, road markings, structures, features, and/or landmarks in the one or more geographic areas. The map data 141 can be in any suitable form. In some instances, the map data 141 can include aerial views of an area. In some instances, the map data 141 can include ground views of an area, including 360-degree ground views. The map data 141 can include measurements, dimensions, distances, and/or information for one or more items included in the map data 141 and/or relative to other items included in the map data 141. The map data 141 can include a digital map with information about road geometry. The map data 141 can be high quality and/or highly detailed.

In one or more arrangements, the map data 141 can include one or more terrain map(s) 142. The terrain map(s) 142 can include information about the ground, terrain, roads, surfaces, and/or other features of one or more geographic areas. The terrain map(s) 142 can include elevation data in the one or more geographic areas. The map data 141 can be high quality and/or highly detailed. The terrain map(s) 142 can define one or more ground surfaces, which can include paved roads, unpaved roads, land, and other things that define a ground surface.

In one or more arrangements, the map data 141 can include one or more static obstacle map(s) 143. The static obstacle map(s) 143 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 143 can have location data, size data, dimension data, material data, and/or other data associated with it. The static obstacle map(s) 143 can include measurements, dimensions, distances, and/or information for one or more static obstacles. The static obstacle map(s) 143 can be high quality and/or highly detailed. The static obstacle map(s) 143 can be updated to reflect changes within a mapped area.

The one or more data store(s) 140 can include sensor data 144. In this context, "sensor data" means any information about the sensors that the vehicle 100 is equipped with, including the capabilities and other information about such sensors. As will be explained below, the vehicle 100 can include the sensor system 120. The sensor data 144 can relate to one or more sensors of the sensor system 120. As an example, in one or more arrangements, the sensor data 144 can include information on one or more LIDAR sensors 124 of the sensor system 120.

In some instances, at least a portion of the map data 141 and/or the sensor data 144 can be located in one or more data store(s) 140 located onboard the vehicle 100. Alternatively, or in addition, at least a portion of the map data 141 and/or the sensor data 144 can be located in one or more data store(s) 140 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 140, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 137, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

The sensor system 120 can also include interior sensor(s) 122 that can capture information within the interior of the vehicle 100, such as occupant-related information. For example, the interior sensor(s) 122 can include cameras, pressure sensors, and the like that can determine the presence of occupants, the position of occupants, the head/gaze of occupants, and the like.

Alternatively, or in addition, the sensor system 120 can include one or more environment sensors 123 configured to acquire, and/or sense driving environment data. "Driving environment data" includes data or information about the external environment in which an autonomous vehicle is located or one or more portions thereof. For example, the one or more environment sensors 123 can be configured to detect, quantify and/or sense obstacles in at least a portion of the external environment of the vehicle 100 and/or information/data about such obstacles. Such obstacles may be stationary objects and/or dynamic objects. The one or more environment sensors 123 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 123 and/or the one or more vehicle sensor(s) 121. However, it will be understood that the embodiments are not limited to the particular sensors described.

As an example, in one or more arrangements, the sensor system 120 has one or more LIDAR sensors 124, one or more sonar sensors 125, and/or one or more cameras 126. In one or more arrangements, the one or more cameras 126 can be high dynamic range (HDR) cameras or infrared (IR) cameras. The sensor system 120 can also include light sensor(s) 127 that can detect ambient light to determine if the vehicle 100 is traveling in a darker or brighter environment.

The vehicle 100 can include an input system 145. An "input system" includes any device, component, system, element or arrangement or groups thereof that enable information/data to be entered into a machine. The input system 145 can receive an input from a vehicle passenger (e.g., a driver or a passenger). The vehicle 100 can include an output system 146. An "output system" includes any device, component, arrangement or groups thereof that enable information/data to be presented to a vehicle passenger (e.g., a person, a vehicle passenger, etc.).

The vehicle 100 can include one or more vehicle systems 130. Various examples of the one or more vehicle systems 130 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 131, a braking system 132, a steering system 133, a throttle system 134, a transmission system 135, a signaling system 136, and/or a navigation system 137. Each of these systems can include one or more devices, components, and/or a combination thereof, now known or later developed.

The navigation system 137 can include one or more devices, applications, and/or combinations thereof, now known or later developed, configured to determine the geographic location of the vehicle 100 and/or to determine a travel route for the vehicle 100. The navigation system 137 can include one or more mapping applications to determine a travel route for the vehicle 100. The navigation system 137 can include a global positioning system, a local positioning system, or a geolocation system.

The processor(s) 110, the privacy system 170, and/or the autonomous driving system 160 can be operatively connected to communicate with the vehicle systems 130 and/or individual components thereof. For example, returning to FIG. 1, the processor(s) 110 and/or the autonomous driving system 160 can be in communication to send and/or receive information from the vehicle systems 130 to control the movement, speed, maneuvering, heading, direction, etc. of the vehicle 100. The processor(s) 110, the privacy system 170, and/or the autonomous driving system 160 may control some or all of these vehicle systems 130 and, thus, may be partially or fully autonomous.

The processor(s) 110, the privacy system 170, and/or the autonomous driving system 160 can be operatively connected to communicate with the vehicle systems 130 and/or individual components thereof. For example, returning to FIG. 1, the processor(s) 110, the privacy system 170, and/or the autonomous driving system 160 can be in communication to send and/or receive information from the vehicle systems 130 to control the movement, speed, maneuvering, heading, direction, etc. of the vehicle 100. The processor(s) 110, the privacy system 170, and/or the autonomous driving system 160 may control some or all of these vehicle systems 130.

The processor(s) 110, the privacy system 170, and/or the autonomous driving system 160 may be operable to control the navigation and/or maneuvering of the vehicle 100 by controlling one or more of the vehicle systems 130 and/or components thereof. For instance, when operating in an autonomous mode, the processor(s) 110, the privacy system 170, and/or the autonomous driving system 160 can control the direction and/or speed of the vehicle 100. The processor(s) 110, the privacy system 170, and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 130 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 140 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160, either independently or in combination with the privacy system 170, can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 130).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system configured to be mounted within a first vehicle having a first vehicle viewing area being at least partially external to the first vehicle, the system comprising:
   a processor; and
   a memory in communication with the processor, the memory including a privacy module having instructions that, when executed by the processor, cause the processor to:
   determine a second vehicle viewing area of a second vehicle using sensor information collected from a sensor of the first vehicle, the second vehicle viewing area being at least partially external to the second vehicle, wherein the first and second vehicles are traveling in a same direction in adjacent lanes, and
   in response to determining that the first vehicle viewing area and the second vehicle viewing area overlap for a duration exceeding a predetermined threshold, control a vehicle system of the first vehicle to adjust a longitudinal position of the first vehicle such that the first vehicle viewing area does not overlap the second vehicle viewing area while the first and second vehicles continue to travel in the same direction.

2. The system of claim 1, wherein the first vehicle viewing area is located laterally with respect to the first vehicle and the second vehicle viewing area is located laterally with respect to the second vehicle.

3. The system of claim 1, wherein the first vehicle viewing area is based on at least one of a position of one or more windows of the first vehicle, physical dimensions of the first vehicle, a presence and location of one or more occupants of the first vehicle, window treatments of the one or more windows of the first vehicle, activation of an interior light of the first vehicle, ambient outdoor light, time of day, and open/close status of the one or more windows of the first vehicle.

4. The system of claim 1, wherein the second vehicle viewing area is based on at least one of a position of one or more windows of the second vehicle, physical dimensions of the second vehicle, a presence and location of one or more occupants of the second vehicle, window treatments of the one or more windows of the second vehicle, activation of an interior light of the second vehicle, ambient outdoor light, time of day, and open/close status of the one or more windows of the second vehicle.

5. The system of claim 1, wherein:
   the first vehicle viewing area is located laterally of the first vehicle on a side of the first vehicle that is located closer to the second vehicle; and
   the second vehicle viewing area is located laterally of the second vehicle on a side of the second vehicle that is located closer to the first vehicle.

6. The system of claim 1, wherein at least one of the first vehicle viewing area and the second vehicle viewing area has a triangular or rectangular shape.

7. A method comprising:
   in response to determining that a first vehicle viewing area and a second vehicle viewing area overlap for a duration exceeding a predetermined threshold and the first and second vehicles are traveling in a same direction in adjacent lanes, controlling a vehicle system of the first vehicle to adjust a longitudinal position of the first vehicle such that the first vehicle viewing area does not overlap the second vehicle viewing area while the first and second vehicles continue to travel in the same direction.

8. The method of claim 7, wherein the first vehicle viewing area is located laterally with respect to the first vehicle and the second vehicle viewing area is located laterally with respect to the second vehicle.

9. The method of claim 7, wherein the first vehicle viewing area is based on at least one of a position of one or more windows of the first vehicle, physical dimensions of the first vehicle, a presence and location of one or more occupants of the first vehicle, window treatments of the one or more windows of the first vehicle, activation of an interior light of the first vehicle, ambient outdoor light, time of day, and open/close status of the one or more windows of the first vehicle.

10. The method of claim 7, wherein the second vehicle viewing area is based on at least one of a position of one or more windows of the second vehicle, physical dimensions of the second vehicle, a presence and location of one or more occupants of the second vehicle, window treatments of the one or more windows of the second vehicle, activation of an interior light of the second vehicle, ambient outdoor light, time of day, and open/close status of the one or more windows of the second vehicle.

11. The method of claim 7, wherein:
the first vehicle viewing area is located laterally of the first vehicle on a side of the first vehicle that is located closer to the second vehicle; and
the second vehicle viewing area is located laterally of the second vehicle on a side of the second vehicle that is located closer to the first vehicle.

12. The method of claim 7, wherein at least one of the first vehicle viewing area and the second vehicle viewing area has a triangular or rectangular shape.

13. A non-transitory computer-readable medium storing instructions for controlling a longitudinal position of a first vehicle having a first vehicle viewing area being at least partially external to the first vehicle that, when executed by a processor, causes the processor to:
determine a second vehicle viewing area of a second vehicle using sensor information collected from a sensor of the first vehicle, the second vehicle viewing area being at least partially external to the second vehicle, wherein the first and second vehicles are traveling in a same direction in adjacent lanes; and
in response to determining that the first vehicle viewing area and the second vehicle viewing area overlap for a duration exceeding a predetermined threshold, control a vehicle system of the first vehicle to adjust a longitudinal position of the first vehicle such that the first vehicle viewing area does not overlap the second vehicle viewing area while the first and second vehicles continue to travel in the same direction.

14. The non-transitory computer-readable medium of claim 13, wherein the first vehicle viewing area is located laterally with respect to the first vehicle and the second vehicle viewing area is located laterally with respect to the second vehicle.

15. The non-transitory computer-readable medium of claim 13, wherein the first vehicle viewing area is based on at least one of a position of one or more windows of the first vehicle, physical dimensions of the first vehicle, a presence and location of one or more occupants of the first vehicle, window treatments of the one or more windows of the first vehicle, activation of an interior light of the first vehicle, ambient outdoor light, time of day, and open/close status of the one or more windows of the first vehicle.

16. The non-transitory computer-readable medium of claim 13, wherein the second vehicle viewing area is based on at least one of a position of one or more windows of the second vehicle, physical dimensions of the second vehicle, a presence and location of one or more occupants of the second vehicle, window treatments of the one or more windows of the second vehicle, activation of an interior light of the second vehicle, ambient outdoor light, time of day, and open/close status of the one or more windows of the second vehicle.

17. The non-transitory computer-readable medium of claim 13, wherein:
the first vehicle viewing area is located laterally of the first vehicle on a side of the first vehicle that is located closer to the second vehicle; and
the second vehicle viewing area is located laterally of the second vehicle on a side of the second vehicle that is located closer to the first vehicle.

* * * * *